(12) United States Patent
Booden et al.

(10) Patent No.: US 7,942,035 B2
(45) Date of Patent: May 17, 2011

(54) ANODE LEAK TEST IMPLEMENTATION

(75) Inventors: Valerie Jordan Booden, Canton, MI (US); William F. Sanderson, Commerce Township, MI (US); Jeffery R. Grimes, Canton, MI (US); Milos Milacic, New Boston, MI (US)

(73) Assignee: Ford Motor Company, Dearborn, MI (US)

( * ) Notice: Subject to any disclaimer, the term of this patent is extended or adjusted under 35 U.S.C. 154(b) by 478 days.

(21) Appl. No.: 12/099,916

(22) Filed: Apr. 9, 2008

(65) Prior Publication Data

US 2009/0255326 A1 Oct. 15, 2009

(51) Int. Cl.
*G01M 3/26* (2006.01)
(52) U.S. Cl. .................................................. 73/40.5 R
(58) Field of Classification Search ......... 73/40, 40.5 R, 73/49.7
See application file for complete search history.

(56) References Cited

U.S. PATENT DOCUMENTS

| | | | |
|---|---|---|---|
| 5,763,764 A * | 6/1998 | Mieczkowski et al. ........... | 73/40 |
| 6,079,252 A | 6/2000 | Tabler et al. | |
| 6,708,552 B2 | 3/2004 | Weldon | |
| 6,815,107 B2 | 11/2004 | Inai et al. | |
| 6,851,298 B2 | 2/2005 | Miura et al. | |
| 6,918,370 B2 | 7/2005 | Yamaoka et al. | |
| 7,127,937 B1 | 10/2006 | Thyroff | |
| 7,367,349 B2 * | 5/2008 | Thyroff ........................... | 137/14 |
| 2006/0166060 A1 | 7/2006 | Miura | |
| 2007/0202367 A1 | 8/2007 | Yoshida | |
| 2007/0207355 A1 | 9/2007 | Yoshida | |
| 2009/0064764 A1 * | 3/2009 | Kizaki et al. ............... | 73/40.5 R |

OTHER PUBLICATIONS mk:@MSITStore:C:\Program%20Files/Minitab%2015\resources\1033\Mtbst.chm::/Shared, "t-value", Dec. 9, 2010, 5 pages.
http://faculty.vassar.edu/lowry/ch11pt1.html, "Chapter 11—t-Test for the Significance of the Difference between the Means of Two Independent Samples", Richard Lowry, 1999-2010, Dec. 10, 2010, 10 pages.
W. Mendenhall and T. Sincich, "Statisitics for Engineering and The Sciences", Fifth Edition, pp. 336-369.

* cited by examiner

*Primary Examiner* — John Fitzgerald
(74) *Attorney, Agent, or Firm* — Damian Porcari; Brooks Kushman P.C.

(57) ABSTRACT

A system and method is provided for detecting an anode leak of an anode stream in a fuel cell stack. The system comprises a controller that stores at least one first predetermined control value that corresponds to a first pre-selected pressure level. The controller generates at least one first operational control value. The controller controls a pressure regulator device to adjust the pressure of the anode stream to reach the first pre-selected pressure level with the at least one first operational control value. The controller compares the at least one first operational control value to the at least one first predetermined control value. The controller determines the presence of an anode leak in the anode stream based on the comparison of the at least one first operational control value to the at least one first predetermined control value.

20 Claims, 4 Drawing Sheets

ANODE LEAK TEST IMPLEMENTATION

BACKGROUND

1. Technical Field

The embodiments of the present invention generally relate of an anode leak test implementation for use in a fuel cell based vehicle.

2. Background Art

Hydrogen is the most abundant element in the universe, accounting for more than 90% of the molecules and more than 75% of mass. Due to the small molecular size and high buoyancy of hydrogen, hydrogen is not available in free form on Earth. As a fuel, hydrogen is unique in that hydrogen is odorless, colorless, tasteless and burns invisibly in sunlight.

It is known that a number of fuel cells are joined together to form a fuel cell stack. Hydrogen is generally presented to the fuel cell stack on an anode side of the fuel cell stack. Air is generally presented to the fuel cell stack on a cathode side of the fuel cell stack. Such a stack generally provides electrical current in response to electrochemically converting hydrogen and oxygen into water. The electrical current generated by the fuel cell stack is used to drive various devices in the vehicle and the vehicle itself.

In light of the above characteristics of hydrogen and the use of hydrogen as a fuel source for fuel cell based vehicles or other implementations, increased efforts at detecting hydrogen leaks on the anode side of the fuel cell stack is gaining more and more attention by manufacturers.

SUMMARY

A system and method is provided for detecting an anode leak of an anode stream in a fuel cell stack. The system comprises a controller that stores at least one first predetermined control value that corresponds to a first pre-selected pressure level. The controller generates at least one first operational control value. The controller controls a pressure regulator device to adjust the pressure of the anode stream to reach the first pre-selected pressure level with the at least one first operational control value. The controller compares the at least one first operational control value to the at least one first predetermined control value. The controller determines the presence of an anode leak in the anode stream based on the comparison of the at least one first operational control value to the at least one first predetermined control value.

DETAILED DESCRIPTION OF THE PREFERRED EMBODIMENT(S)

Figure 1:
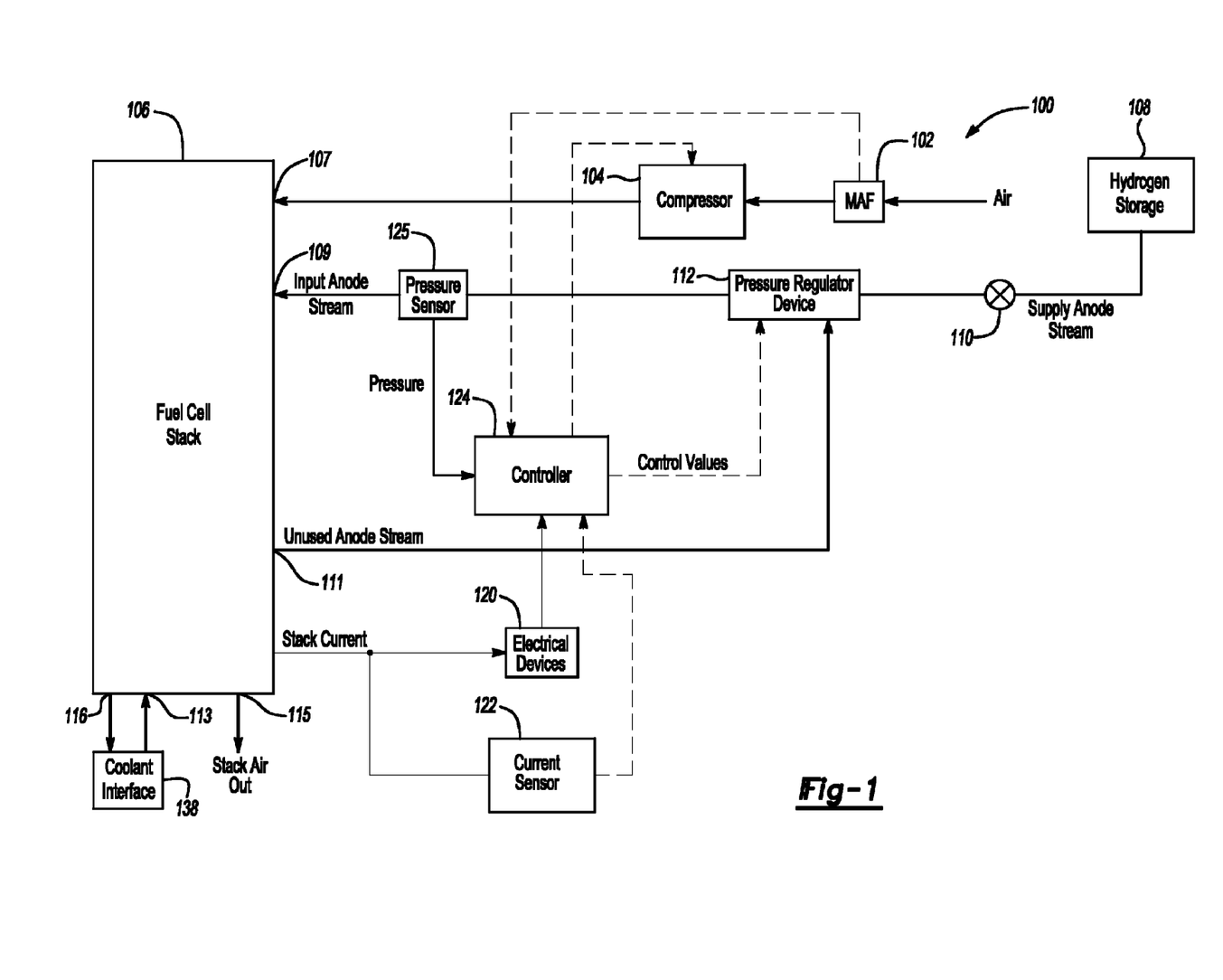
FIG. 1 illustrates an exemplary fuel cell stack system in accordance to one embodiment of the present invention.

FIG. 1 illustrates an exemplary fuel cell recirculating system 100 in accordance with one embodiment of the present invention. The system 100 may be implemented in fuel cell based electric vehicle or fuel cell based hybrid vehicle or any other such apparatus that uses electrical current generated by a hydrogen fuel cell to drive various devices.

A first fluid stream (or cathode stream) which comprises of air is fed to a mass air flow (MAF) sensor 102. The air passing through the MAF sensor 102 is atmospheric air. The MAF sensor 102 measures the amount of flow of air in the fluid stream. An air compressor 104 pressurizes the air stream and delivers the air stream to a fuel cell stack 106. The fuel cell stack 106 includes a first inlet 107 for receiving the air stream. A humidifier (not shown) may be added to the system 100 to add water vapor into the air stream. If the air includes a high water content, a humidity sensor (not shown) may be needed to measure the wet air. The water may be needed to ensure that membranes (not shown) in the fuel cell stack 106 remain humidified to provide for optimal operation of the fuel cell stack 106.

A tank (or supply) 108 presents a supply fuel stream (or an anode stream) in the form of hydrogen. The supply anode stream comprises compressed hydrogen. While compressed hydrogen may be used in the system 100, any hydrogen fuel source may be implemented in the system 100. For example, liquid hydrogen, hydrogen stored in various chemicals such as sodium borohydride or alanates, or hydrogen stored in metal hydrids may be used instead of compressed gas.

A tank valve 110 controls the flow of the supply hydrogen. A pressure regulator device 112 regulates the flow of the supply hydrogen. The pressure regulator device 112 may include any type of device used to control the pressure or flow rate of a fluid. For example, the pressure regulator device 112 may be implemented as a pressure regulator or as a variable or multistage ejector. The pressure regulator device 112 is configured to combine the supply anode stream (e.g., hydrogen received from the tank 108) with an unused anode stream (e.g., recirculated hydrogen from the fuel cell stack 106) to generate an input anode stream (or stack hydrogen). A humidifier (not shown) may be provided to add water vapor to the input anode stream. Humidified water vapor in the input anode stream may be needed to ensure that the membranes in the fuel cell stack 106 remain humidified to provide for optimal operation of the fuel cell stack 106.

The pressure regulator device 112 controls the flow of the input anode stream to the fuel cell stack 106. The fuel cell stack 106 includes a second inlet 109 that is adapted to receive the input anode stream from the pressure regulator device 112. The fuel cell stack 106 generates stack current in response to electrochemically converting the hydrogen from the input anode stream and oxygen from air in the first fluid stream.

Various electrical devices 120 are coupled to the fuel cell stack 106 to consume such power in order to operate. If the system 100 is used in connection with a vehicle, the devices 120 may include a motor or a plurality of vehicle electrical components that each consume power to function for a particular purpose. For example, such devices 120 may be associated with and not limited to a vehicle powertrain, occupant heating and cooling, interior/exterior lighting, entertainment devices, and power locking windows. The particular types of devices 120 implemented in the vehicle may vary based on vehicle content, the type of motor used, and the particular type of fuel cell stack implemented. A current sensor 122 measures the stack current generated by fuel cell stack 106. The current sensor 122 transmits measured current readings to a controller 124. The controller 124 transmits control values to the pressure regulator device 112 to control the flow of the input anode stream to the fuel cell stack 106. A pressure sensor 125 is coupled between the pressure regulator device 112 and the fuel cell stack 106 to measure the pressure of the hydrogen prior to the hydrogen being delivered to the fuel cell stack 106. The pressure sensor 125 transmits a feedback signal (e.g., PRESSURE) which is indicative of the pressure of hydrogen in the input anode stream.

Excess amounts of air and hydrogen are delivered to the fuel cell stack 106 to increase operational robustness of the fuel cell stack 106. The fuel cell stack may discharge unused hydrogen in the unused anode stream. An outlet 111 of the fuel cell stack 106 is adapted to discharge the unused anode stream. The unused anode stream may include various impurities such as nitrogen and water both in liquid and vapor form in addition to hydrogen.

The fuel cell stack 106 includes an outlet 115 that is configured to discharge excess air. The fuel cell stack 106 includes outlet 116 that is adapted to present coolant in the form of de-ionized water ethylene glycol (DIWEG) or other suitable coolant in response to the heat generated due to the chemical processing of hydrogen and oxygen (e.g., from the air stream). A cooling interface 138 may receive the DIWEG from the fuel cell stack 106. The cooling interface 138 may also provide stack coolant to an inlet 113 of the fuel cell stack 106.

The pressure regulator device 112 is adapted to increase or decrease the pressure of the input anode stream to the stack 106 in response to control values transmitted by the controller 124. The pressure regulator device 112 is adapted to receive the supply anode stream at a constant pressure from the tank valve 110. The pressure regulator device 112 may receive the unused anode stream from the fuel cell stack 106 (or a purging arrangement not shown) at varying flow rates.

As noted above, the pressure regulator device 112 may be implemented as any pressure regulating device that is generally known in the art. Generally speaking, such pressure regulating devices adjust the pressure of a fluid in response to control values (or signals) having various electrical based characteristics. Such characteristics may include pulse width modulated (PWM) values, analog values or digital values depending on the particular type of pressure regulating device implemented. In one example, the pressure regulator device 112 may be implemented as a pulsing valve. The controller 124 may transmit control values as PWM based values for controlling the pressure regulator to increase or decrease the flow rate of input anode stream to the fuel cell stack 106. In another example, the pressure regulator device 112 may be implemented as an ejector. The ejector may be implemented with a solenoid controlled needle actuator (not shown). Such a solenoid controlled needle actuator is disclosed in U.S. patent application Ser. No. 11/830,898, entitled "System and Method for Recirculating Unused Fuel in Fuel Cell Application", to Brighton et al., which is hereby incorporated by reference in its entirety. The solenoid may move the needle in the ejector in response to the control values being analog thereby allowing for an increase or decrease of the pressure of input anode stream presented to the fuel cell stack 106. The movement of the needle is variable in nature to allow for different flow rates of the unused anode stream to be combined with the supply anode stream from the tank 108. Such a variable characteristic allows the ejector to adjust the overall flow and pressure of the input anode stream presented to the fuel cell stack 106.

The system 100 utilizes a series of anode leak tests that are generally performed when the load on the fuel cell stack 106 is stable. The tests are generally performed on the system 100 when driver demand is low and the overall flow rate and pressure of hydrogen in the system 100 is stable. In one example, the fuel cell stack 106 may be stable when the vehicle is idling. The fuel cell stack 106 may also be stable when the vehicle is in other such operating modes.

In a first level anode leak test, the controller 124 determines whether the fuel cell stack 106 is in the idle state based on the amount of current generated by the fuel cell stack 106. In response to determining that the fuel cell stack 106 is in the idle state, the controller 124 controls the pressure regulator device 112 to control the pressure of the input anode stream at a first pre-selected pressure level in response to various control values. As noted above, such control values or values may be PWM-based, analog, or digital. The pressure sensor 125 transmits the actual pressure amount on the signal PRESSURE back to the controller 124 to determine if the actual pressure amount is equivalent to the first pre-selected pressure level. The controller 124 measures and records the values associated with driving the pressure regulator device 112 to determine if such values are equal to predetermined control value(s). In the event the control values are not equal to first predetermined control values the controller 124 may run a second level anode test in response to the fuel cell stack 106 being in an idle state.

The second level anode test may be similar to the first level anode test with the exception of the use of a second pre-selected pressure level being utilized instead of the first pre-selected pressure level. In addition, second predetermined value(s) are established to correspond to the second pre-selected pressure level. The second pre-selected pressure level may correspond to a higher pressure level than that of the first pre-selected pressure level. The first and second level anode leak test are discussed in more detail in connection with FIGS. 3 and 4. Prior to performing the first and second level anode leak tests, the system 100 is calibrated to define the predetermined control ranges for the first and second pre-selected pressure levels, respectively. Such a calibration may be performed at an end-of-line (EOL) test while the vehicle is being produced or manufactured.

Figure 2:
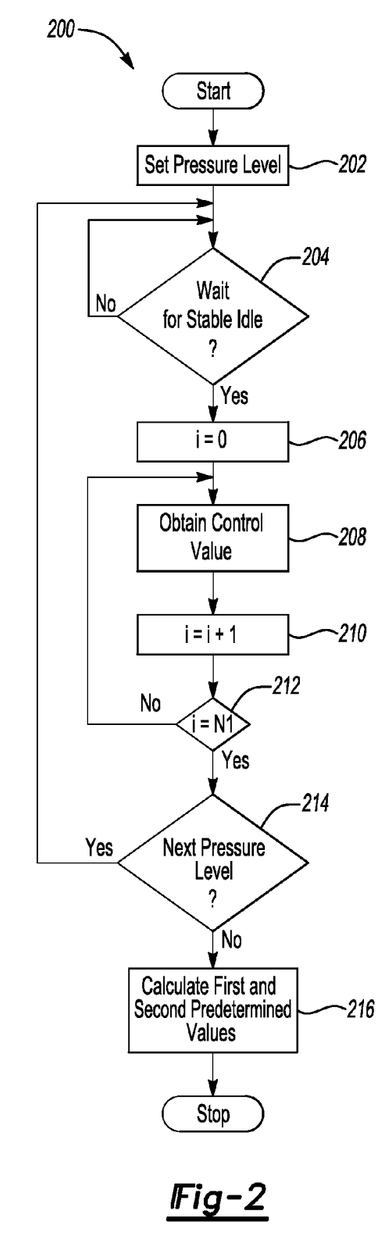
FIG. 2 illustrates a block diagram from establishing first and second predetermined pulse width modulated values as used in accordance with first and second level anode leak tests.

FIG. 2 illustrates a block diagram 200 for establishing first and second predetermined control value(s) as used in accordance with the first and second level anode leak tests, respectively.

In block 202, the pressure regulator device 112 is controlled (via the controller 124 with the control values) to distribute hydrogen (e.g., in the input anode stream) to the first pre-selected pressure level. The first pre-selected pressure level generally corresponds to a low pressure level. The first pre-selected pressure level may correspond to the pressure difference between the anode and cathode.

In block 204, the current sensor 122 measures the amount of current generated by the fuel cell stack 106 to determine if the stack current is equal to a predetermined amount of current which generally corresponds to the fuel cell stack 106 being in an idle state. In one example, a stack current of 3 A may correspond to the fuel cell stack 106 being in the idle state. The particular amount of stack current used to indicate whether the fuel cell stack 106 is in the idle state may vary based on the type of fuel cell stack implemented, various vehicle loads, and other system-to-system variations. If the measured stack current is not equal to the predetermined amount of current, then the diagram 200 remains in the block 204 until the predetermined amount of current is achieved. If the measured stack current is equal to the predetermined amount of current, then the diagram 200 moves to block 206.

In block 206, a counter variable (e.g., i) is initialized.

In block 208, the controller 124 obtains the corresponding control value that is being used to drive the pressure regulator device 112 in order to achieve the first pre-selected pressure level attained in block 202. The controller 124 stores the control value in volatile memory.

In block 210, the counter variable i is incremented in response to storing the control value.

In block 212, the diagram 200 determines whether the counter value i is equal a predetermined sample size (e.g., N1). Generally speaking, the system 100 experiences noise which may cause a number of control values to be measured while the first pre-selected pressure level is attained. Due to such a condition, N1 is selected to achieve a sample size that ensures a high degree of confidence. In one example, N1 may correspond to a sample size of 120 measurements of control values that are used to achieve the first pre-selected pressure level. The sample size may vary based on the desired criteria of a particular implementation. If i is equal to N1, then the diagram 200 moves to block 214. If i is not equal to N1, then the diagram 200 moves back to block 208 to obtain additional measurements.

In block 214, a determination is made whether to control the pressure regulator device 112 via the controller 124 with another set of control values to distribute hydrogen in the input anode stream at the second pre-selected pressure level. The second pre-selected pressure level is set to a pressure that is greater than the first pre-selected pressure level. If the second pre-selected pressure level has not been established, the diagram 200 moves back to block 202. If the second pre-selected pressure level has been established, the method 200 moves to block 216.

In block 216, the controller 124 determines the first predetermined values and stores the first predetermined values in non-volatile memory (e.g., EEPROM). In one example, the first predetermined values may correspond to a range of measured control values to achieve the first pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such an example, the average and/or the standard deviation may be defined as first predetermined value(s).

Block 202 is re-executed to establish the second pre-selected pressure level. In block 202, the pressure regulator device 112 is controlled (via the controller 124 with control values) to distribute hydrogen at the second pre-selected pressure level.

Block 204 is re-executed to determine if the stack current is equal to a predetermined amount of current which generally corresponds to the fuel cell stack 106 being in an idle state. If the measured stack current is not equal to the predetermined amount of current, then the diagram 200 remains in the block 204 until the predetermined amount of current is achieved. If the measured stack current is equal to the predetermined amount of current, then the diagram 200 moves to block 206.

Block 206 is re-executed to re-initialize i.

Block 208 is re-executed so that the controller 124 obtains the corresponding control value that is being used to drive the pressure regulator device 112 to achieve the second pre-selected pressure level attained in the re-executed block 202. The controller 124 stores the corresponding control value in volatile memory.

Block 210 is re-executed to increase i in response to storing the control value.

Block 212 is re-executed to determine whether the counter value i is equal to N1. As noted above, the system 100 experiences noise which may necessitate for a number of control values to be measured while the second pre-selected pressure level is attained. Due to such a condition, N1 is selected to achieve a sample size that is sufficient to establish a high degree of confidence. If i is not equal to N1, then the diagram 200 moves back to block 208 to obtain additional measurements.

Block 214 is re-executed to determine if the second pre-selected pressure level control value has been established. The diagram moves to block 216.

In block 216, the controller 124 determines the second predetermined values and stores the second predetermined values in non-volatile memory. In one example, the second predetermined control values may correspond to a range of measured control values to achieve the second pre-selected pressure level. Such a range may include the sample size N1. As noted above, in one example, the sample size may include 120 control value measurements. In such a case, a range of 120 control values may be stored in non-volatile memory. In yet another example, the controller 124 may calculate an average and standard deviation of the measurements which comprise the sample size N1. In such a case, the average and/or the standard deviation may be defined as first predetermined value(s).

Figure 3:
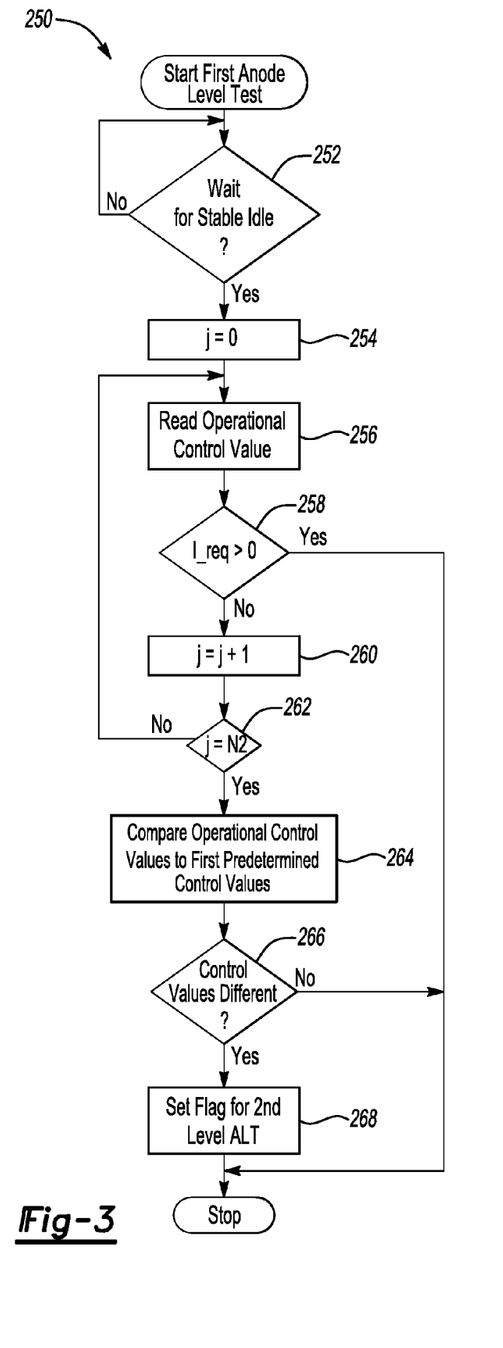
FIG. 3 illustrates a block diagram for performing a first level anode leak test.

FIG. 3 illustrates a block diagram 250 for performing the first level anode leak test. In block 252, the current sensor 122 measures the amount of current generated by the fuel cell stack 106 to determine if the stack current is equal to the predetermined amount of current. Such a condition is indicative of whether the fuel cell stack 106 is in the idle or stable state. If the measured stack current is not equal to the predetermined amount of current, then the first anode leak test may not be performed. If the measured stack current is equal to the predetermined amount of current, then the diagram 250 moves to block 254.

In block 254, a counter variable (e.g., j) is initialized.

In block 256, the controller 124 reads and stores a particular operational control value that is being used to drive the pressure regulator device 112 to adjust the pressure of the input anode stream to reach the first pre-selected pressure level.

In block 258, the controller 124 determines whether the fuel cell stack 106 is coming out of the idle state. For example, the controller 124 may assess the current readings being transmitted by the current sensor or read message activity on a multiplexed bus protocol (e.g., a control area network (CAN)) to determine what the driver is demanding (e.g., throttle position, brake position, etc.). In the event the fuel cell stack 106 comes out of the idle state, the diagram 200 ceases to perform the first anode level test and waits for future fuel cell stack 106 idle events to perform the test. In general, the first anode leak test may be attempted and fully performed every time the fuel cell stack 106 is in the idle state irrespective of the state of the vehicle.

In block 260 j is incremented.

In block 262, the diagram 250 determines whether the counter variable j is equal to a predetermined sample size (e.g., N2). As noted above, it may be necessary for the controller 124 to obtain multiple readings of the control values based on the desired confidence level in view of noise considerations. If the counter variable j is equal to N2, then the diagram 250 moves to block 264. If the counter variable j is not equal to N2, then the diagram 250 moves back to block 258. In general, it may take seconds for blocks 256, 258, 260 and 262 to be executed (e.g., 5 seconds may correspond to the amount of time needed to obtain the PWM value measurements). The particular amount of time to execute blocks 256, 258, 260 and 262 may vary depending on controller design, software and the desired amount of confidence that may be needed.

In block 264, the controller 124 compares the operational control values that were stored or measured from block 256 to the first predetermined control values as established in the diagram 200. For example, the controller 124 may compare the operational control values of block 256 to the first predetermined control values (e.g., the entire set of 120 measurements of the first predetermined control values as obtained in block 216). In such an example, a 2 sample t test may be performed to compare the entire set of operational control values of block 256 to the entire set of the first predetermined control values. In general, the 2 sample t test may be employed to determine whether the two sets of data are equal to each other. The 2 sample t test is set forth in "STATISTICS FOR ENGINEERING AND SCIENCE" by W. Mendenhall and T. Sincich, fourth edition, p. 422-494, which is hereby incorporated by reference. In the event, the first predetermined control values are represented by the average and/or the standard deviation of the sample size N1 as noted in connection with FIG. 2, the controller 124 may perform a 1 sample t test. The 1 sample t test is also set forth in "STATISTICS FOR ENGINEERING AND SCIENCE" by W. Mendenhall and T. Sincich as set forth above. The controller 124 performs the 1 sample t test by comparing all of the measure values which comprise the sample size N2 to the average and the standard deviation.

In block 266, the controller 124 determines whether the stored operational control values of block 256 are equal to the first predetermined control values. If the stored operational control values of block 256 are not equal to the second predetermined control values, the diagram 250 moves to block 268. If the stored operational control values of block 256 are equal to the first predetermined control values, the diagram 250 moves to block 252. It is appreciated that the controller 124 employs a number of statistically based methods to determine if the values are equal or not equal to each other. For example, the values may be statistically equal to each other to be deemed equal. Likewise, in the event the values are not within some pre-defined statistical range, the values may not be considered equal.

In block 268, the controller 124 sets a flag to indicate that the second anode leak test is needed to be performed.

In general, if the stored operational control values of block 256 are different from the first predetermined control values, such a condition may be indicative of an anode leak in the system 100. For example, a leak may be inferred since the controller 124 may have to drive the pressure regulator device 112 at operational control values that are different than the control values used to establish the first predetermined control values in order to achieve the first pre-selected pressure level. The operational control values needed to maintain the pressure of the hydrogen at the first pre-selected pressure level becomes distinguishable as an error state or indicator in the event such control values are not equal to the first predetermined control values.

Figure 4:
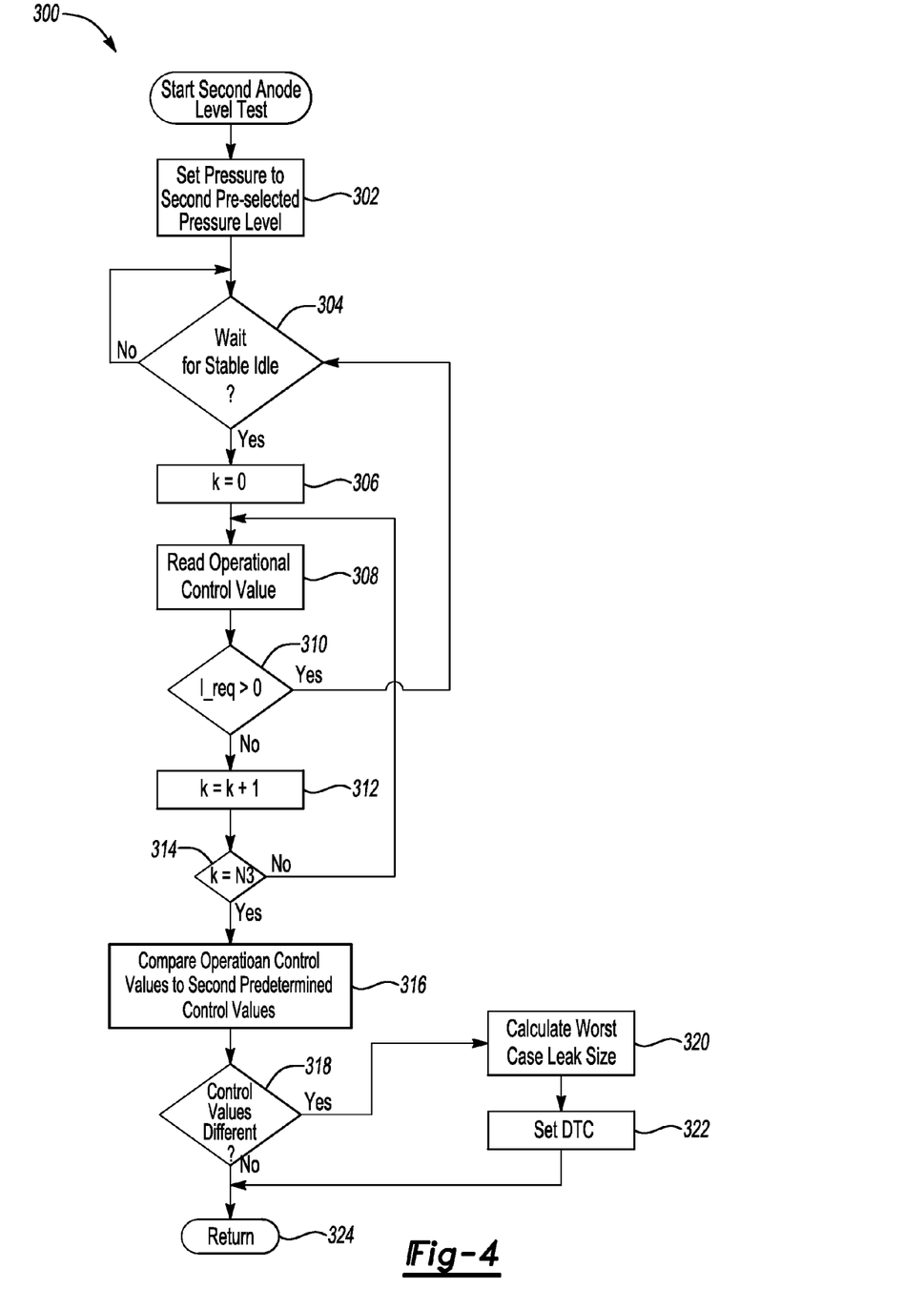
FIG. 4 illustrates a block diagram from performing a second level anode leak test.

FIG. 4 illustrates a block diagram 300 for performing the second level anode leak test. The second level anode leak test is generally performed when the controller 124 sets the flag indicating that the operational control values do not fall within the first predetermined value range as noted in diagram 250.

In block 302, the controller 124 controls the pressure regulator device 112 to adjust the pressure of the hydrogen in the input anode stream to the second pre-selected pressure level.

In block 304, the current sensor 122 measures the amount of current generated by the fuel cell stack 106 to determine if the stack current is equal to the predetermined amount of current. If the measured stack current is not equal to the predetermined amount of current, then the diagram 300 waits for the fuel cell stack 106 to enter into the idle state. If the measured stack current is equal to the predetermined amount of current, then the diagram 300 moves to block 306.

In block 306, a counter variable (e.g., k) is initialized.

In block 308, the controller 124 reads and stores the particular operational control value that is being used to drive the pressure regulator device 112 to adjust the pressure of the input anode stream to reach the second pre-selected pressure level.

In block 310, the controller 124 determines whether the fuel cell stack 106 is coming out of the idle state. In the event the fuel cell stack 106 comes out of the idle state, the diagram 300 moves to the block 304. In the event the fuel cell stack 106 remains in the idle state, the diagram 200 moves to block 312.

In block 312, the counter variable k is incremented.

In block 314, the diagram 300 determines whether the counter variable k is equal to a predetermined sample size (e.g., N3). If k is equal to N3, then the diagram 300 moves to block 316. If k is not equal to N3, then the diagram 300 moves back to block 308.

In block 316, the controller 124 compares the operational control values that were stored or measured in block 308 to the second predetermined control values as established in the diagram 200. The controller 124 compares the operational control values of block 308 to the second predetermined control values in a similar manner as disclosed in block 264.

In block 318, the controller 124 determines whether the stored operational control values of block 308 are equal to the second predetermined control values. If the stored operational control values of block 308 are not equal to the second predetermined control values, the diagram 300 moves to block 320. If the stored operational control values of block 308 are equal to the second predetermined control values, the diagram 300 moves to block 324. As noted above, the controller 124 may employ any number of statistically based methods to determine if the values are equal or not equal to each other. For example, the values may be statistically equal to each other to be deemed equal. Likewise, in the event the values are not within some pre-defined statistical range, the values may not be considered equal.

In block 320, the controller 124 calculates the worst case leak size. For example, the controller 124 may calculate the worst case leak size based on f(PRESSURE, control input, and operating system parameters), function f depends on system and controller design. In one example, function f may be described as:

$$\text{Leak Size} = \frac{-a + bP_{H_2 Supply} + c(\mu)}{P_{anode} - P_{out}} \quad (1)$$

where $P_{out}$ denotes the pressure at the exit of the leak (cathode or ambient), $p_{H_2 supply}$ denotes the incoming pressure, and $P_{anode}$ denotes the pressure on the signal PRESSURE, u corresponds to the one or more of the operational control values acquired in block 308, and parameter a, b, and c are variables which depend on system architecture and/or other such design criteria associated with the fuel cell stack 106. The diagram 250 contemplates that the block 320 may also be performed in place of block 268 in the event the diagram 300 is not implemented.

In block 322, the controller 124 sets a diagnostic trouble code which may be retrieved by a service tool.

In block 324, the diagram 300 exits out of the second anode leak test.

The first and second anode leak tests as disclosed adds flexibility in timing while being performed in that such tests are non-intrusive and are transparent to the driver or user. The first and second anode leak tests do not negatively affect the performance of the fuel cell stack system 100. The system 100 generally contemplates that the first anode leak test may be performed to detect the presence of an anode leak without the need to perform the second anode leak test. The second anode leak test is performed at the second pre-selected pressure level that is higher than the first pre-selected test (e.g., at a high resolution) to confirm the findings of the first anode leak test. The first and/or second anode leak tests may be applied to a stationary fuel cell apparatus that is generally situated to generate power in response to electrochemically converting hydrogen from the anode side and oxygen from the cathode side.

Figure 5:
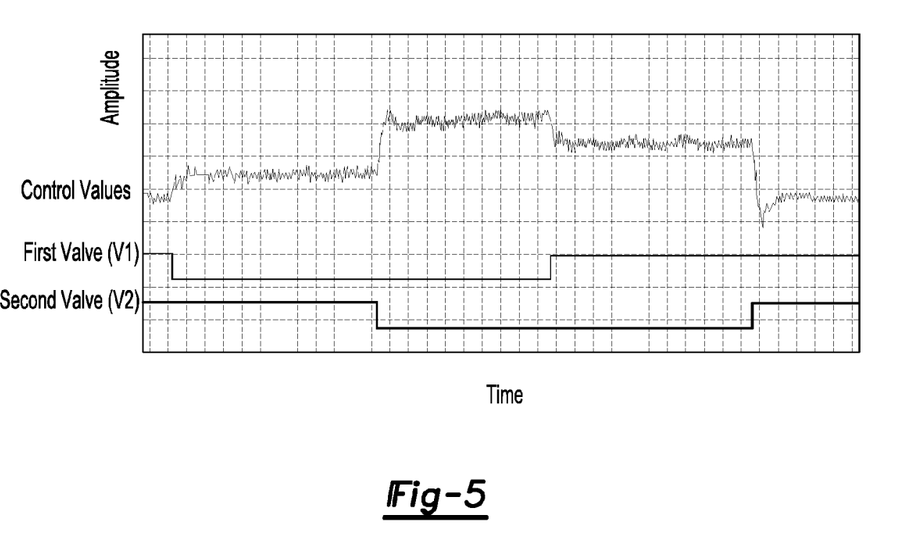
FIG. 5 is a plot depicting the state of a control signal as the fuel cell stack system of FIG. 1 undergoes one or more leaks.

FIG. 5 is a plot depicting the state of the control signal as the fuel cell stack system 100 undergoes one or more leaks. A Design of Experiment (DOE) was conducted to illustrate the manner in which the control values may be used as an error state indicator in the event of hydrogen leaks in the system 100. A first valve V1 and a second valve V2 were installed in the system 100 to simulate hydrogen leaks. The first valve V1 enables a leak between hydrogen pressurized anode and the second valve V2 enables a controlled leak from anode to ambient. At the zero reference point of the plot, both the first valve V1 and the second valve V2 are closed. Further down the x-axis, the first valve V1 is opened while the second valve V2 remains closed. As shown, the control values increase in response to the first valve V1 opening. The plot illustrates that as both valves V1 and V2 are open, the control values increase over the previous state in which only the first valve V1 was open. The DOE establishes that monitoring the state of the control values may serve as a beneficial indicator in detecting the pressure of leaks regardless of the severity of the leak and that the system 100 and the first and second anode leak tests as disclosed above are generally configured to detect hydrogen leaks in the event hydrogen leaks into the air pressurized cathode or into the atmosphere (or ambient).

While the best mode for carrying out the invention has been described in detail, those familiar with the art to which this invention relates will recognize various alternative designs and embodiments for practicing the invention as defined by the following claims.

What is claimed:

1. A system for detecting an anode leak of an anode stream driven in a fuel cell stack of a vehicle at varying pressure levels by a pressure regulator device, wherein the fuel cell stack generates electrical current in response to the anode stream, the system comprising:
   a controller operably coupled to the pressure regulator device and configured to:
      store at least one first predetermined control value which is indicative of a first pre-selected pressure level;
      generate at least one first operational control value;
      control the pressure regulator device to adjust the pressure of the anode stream to reach the first pre-selected pressure level with the at least one first operational control value;
      compare the at least one first operational control value to the at least one first predetermined control value; and
      determine the presence of an anode leak in the anode stream based on the comparison of the at least one first operational control value to the at least one first predetermined control value.

2. The system of claim 1 wherein the controller is configured to determine the presence of an anode leak in response to the at least one first operational control value not being equal to the at least one first predetermined control value.

3. The system of claim 2 wherein the controller is configured to set a flag in response to the at least one first operational control value not being equal to the at least one first predetermined control value.

4. The system of claim 2 wherein the controller is further configured to calculate a worst case leak size in response to the at least one first operational control value not being equal to the at least one first predetermined control value.

5. The system of claim 1 wherein the controller is further configured to store at least one second predetermined control value that corresponds to a second pre-selected pressure level.

6. The system of claim 5 wherein the controller is further configured to generate at least one second operational control value and to control the pressure regulator device to adjust the pressure of the anode stream to reach the second pre-selected pressure level with the at least one second operational control value.

7. The system of claim 6 wherein the controller is further configured to compare the at least one second operational control value to the at least one second predetermined control value for validating the presence of an anode leak in the anode stream.

8. The system of claim 7 wherein the controller is further configured to calculate a worst case leak size in response to determining that the at least one second operational control value is not equal to the at least one second predetermined control value.

9. The system of claim 1 wherein the controller is further configured to determine whether the fuel cell stack is in an idle state prior to controlling the pressure regulator device to adjust the pressure of the anode stream to reach the first pre-selected pressure level with the at least one first operational control value.

10. The system of claim 9 further comprising a current sensor operably coupled to the fuel cell stack and to the controller, wherein the current sensor measures an amount of current generated by the fuel cell stack and transmits the measured amount of current to the controller.

11. The system of claim 10 wherein the controller is further configured to determine that the fuel cell stack is in the idle state in response to the measured amount of current being below a predetermined current level.

12. A method for detecting an anode leak of an anode stream driven in a fuel cell stack of a vehicle at varying pressure levels by a pressure regulator device, wherein the fuel cell stack generates electrical current in response to the anode stream, the method comprising:
   storing at least one first predetermined control value which is indicative of a first pre-selected pressure level;
   generating at least one first operational control value;
   controlling the pressure regulator device to adjust the pressure of the anode stream to reach the first pre-selected pressure level with the at least one first operational control value;
   comparing the at least one first operational control value to the at least one first predetermined control value; and determining the presence of an anode leak in the anode stream based on the comparison of the at least one first operational control value to the at least one first predetermined control value.

13. The method of claim 12 further comprising calculating a worst case leak size in response to the at least one first operational control value not being equal to the at least one first predetermined control value.

14. The method of claim 12 further comprising determining an amount of current generated by the fuel cell stack to determine if the fuel cell stack is in an idle state prior to controlling the pressure regulator device to adjust the pressure of the anode stream to reach the first pre-selected pressure level with the at least one first operational control value.

15. The method of claim 12 further comprising determining the presence of the anode leak in response to determining that the at least one first operational control value is not equal to the at least one first predetermined control value.

16. The method of claim 15 further comprising storing at least one second predetermined control value that corresponds to a second pre-selected pressure level and controlling the pressure regulator device to adjust the pressure of the anode stream to reach the second pre-selected pressure level with the at least one second operational control value.

17. The method of claim 16 further comprising comparing the at least one second operational control value to the at least one second predetermined control value and to validate the presence of an anode leak in the anode stream.

18. The method of claim 17 further comprising calculating a worst case leak size in response to determining that the at least one second operational control value is not equal to the at least one second predetermined control value.

19. A method for detecting an anode leak of an anode stream that is passed through a fuel cell stack to generate electrical current, wherein the fuel cell stack generates electrical current in response to the anode stream; the method comprising:
    defining a first pre-selected pressure level;
    associating at least one first predetermined control value to the first pre-selected pressure level;
    generating at least one first operational control value;
    controlling a pressure regulator device to adjust the pressure of the anode stream to reach the first pre-selected pressure level with the at least one first operational control value;
    comparing the at least one first operational control value to the at least one first predetermined control value; and
    determining the presence of an anode leak in the anode stream based on the comparison of the at least one first operational control value to the at least one first predetermined control value.

20. The method of claim 19 further comprising determining the presence of the anode leak in response to determining that the at least one first operational control value is not equal to the at least one first predetermined control value.

* * * * *